United States Patent
Mo et al.

(10) Patent No.: US 8,000,378 B2
(45) Date of Patent: Aug. 16, 2011

(54) NARROW CORRELATOR TECHNIQUE FOR MULTIPATH MITIGATION

(75) Inventors: Jun Mo, San Jose, CA (US); Shaowei Han, Palo Alto, CA (US)

(73) Assignee: SiRF Technology Holdings, Inc., San Jose, CA (US)

( * ) Notice: Subject to any disclaimer, the term of this patent is extended or adjusted under 35 U.S.C. 154(b) by 1111 days.

(21) Appl. No.: 11/615,704

(22) Filed: Dec. 22, 2006

(65) Prior Publication Data

US 2008/0151971 A1    Jun. 26, 2008

(51) Int. Cl.
H04B 1/00 (2006.01)
H04L 27/06 (2006.01)

(52) U.S. Cl. .................. 375/148; 375/150; 375/343

(58) Field of Classification Search .................. 375/142, 375/144, 148, 150, 343; 370/320, 335, 342, 370/441
See application file for complete search history.

(56) References Cited

U.S. PATENT DOCUMENTS

| | | | |
|---|---|---|---|
| 5,185,610 A | 2/1993 | Ward | |
| 5,692,008 A | 11/1997 | Van Nee | |
| 5,726,659 A | 3/1998 | Kee | |
| 5,771,456 A | 6/1998 | Pon | |
| 5,901,183 A * | 5/1999 | Garin et al. | 375/343 |
| 5,963,601 A | 10/1999 | Pon | |
| 6,393,046 B1 | 5/2002 | Kohli | |
| 6,484,098 B1 | 11/2002 | Takemura | |
| 6,917,644 B2 | 7/2005 | Cahn | |
| 7,085,537 B2 | 8/2006 | Fernandez-Corbaton et al. | |
| 7,295,535 B2 * | 11/2007 | Halivaara | 370/329 |
| 2001/0012315 A1 * | 8/2001 | Kontola | 375/148 |
| 2003/0118086 A1 * | 6/2003 | Pietila et al. | 375/150 |
| 2004/0208236 A1 | 10/2004 | Fenton | |
| 2007/0211793 A1 * | 9/2007 | Han | 375/150 |

OTHER PUBLICATIONS

Van Dierendonck et al., *Theory and Performance of Narrow Correlator Spacing in a GPS Receiver*, Navigation Journal of the Institute of Navigation, vol. 39, No. 3, pp. 265-283 (Fall 1992).
Fenton et al., *NovAtel's GPS Receiver—the High Peformance OEM Sensor of the Future*, ION GPS-91, pp. 49-58 (Sep. 1991).
Weill, *Multipath Mitigation Using Modernized GPS Signals: How Good Can It Get?*, ION GPS 2002, pp. 493-505 (Sep. 24-27, 2002).
Townsend et al., *A Practical Approach to the Reduction of Pseudorange Multipath Errors in a L1 GPS Receiver*, ION GPS 1994, pp. 143-148 (Sep. 20-23, 1994).
van Nee et al., "*The Multipath Estimating Delay Lock Loop: Approaching Theoretical Accuracy Limits*", IEEE Position, Locating and Navigation Symposium, pp. 246-251 (Arp. 1994).

* cited by examiner

*Primary Examiner* — Don N Vo
(74) *Attorney, Agent, or Firm* — Pillsbury Winthrop Shaw Pittman LLP

(57) ABSTRACT

The present invention provides systems and methods for implementing narrowly spaced correlators to mitigate multipath error, and systems and methods for adaptively changing the correlator spacing for varying multipath conditions. In an embodiment, two sets of correlators with the same code frequency but different code phases are used to implement an adjustable correlator spacing. The correlator spacing is determined by the code phase difference between the two sets of correlators, which can be adjusted, e.g., by adjusting the code phase values of Numerically Controlled Oscillators (NCOs). An advantage of embodiments of the present invention is that they can achieve much narrower correlator spacings than conventional techniques, e.g., by making the code phase difference between the two sets of correlators very small. Further, the correlator spacing can be adjusted for varying multipath conditions, whereas the correlator spacing in conventional techniques is fixed.

19 Claims, 8 Drawing Sheets

NARROW CORRELATOR TECHNIQUE FOR MULTIPATH MITIGATION

FIELD OF THE INVENTION

The present invention relates generally to navigation and spread spectrum signal receivers, and more particularly, to systems and methods for mitigating multipath error based on adjustable correlator spacing implemented in software, hardware, or both.

BACKGROUND OF THE INVENTION

The global positioning system (GPS) is a satellite-based radio-navigation system built and operated by the United States Department of Defense. The system uses twenty-four satellites orbiting the earth at an altitude of about 11,000 miles with a period of about twelve hours. Some additional satellites may be present as spares. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

A GPS receiver can operate in many modes. In a "hot start" mode, the receiver already has the time, its last position, and the information on satellite position (also known in the art as almanacs or ephemeris) stored in its memory. The receiver can use this stored information to determine which satellites are probably visible, and it can then lock onto those satellite signals in a short time. On the other hand, the receiver may have no prior data on its position, time, or almanacs stored in memory. In this "cold start" mode, the receiver has to search for signals from all of the satellites present in the constellation. There are some other modes where partial information on time, position and almanacs are available and the corresponding start mode is known as "warm start."

The GPS receiver has to acquire and lock onto at least four satellites in order to derive the position, velocity and time. Usually, a GPS receiver has many parallel channels, each receiving signals from a separate visible GPS satellite. The acquisition of the satellite signals involves a two-dimensional search of frequency and the PN code phase. Each satellite transmits a unique PN code which repeats every millisecond. The receiver locally generates a replica frequency and a replica code phase and correlates these with the received satellite signals. The PN code has to be searched in at least 2046 phases and the frequency search depends upon the Doppler frequency due to relative motion between the satellite and the receiver. Additional frequency variation may result due to local oscillator instability.

The GPS receiver computes an estimate of the line-of-sight distance from the satellite to the receiver which may include errors due to receiver clock bias, and other effects. This estimated distance is known as the pseudo-range. The estimate of the pseudo-range often contains additional errors due to multi-path, i.e., the reflections of the signals by many objects such as buildings, mountains, etc., as the signals propagate from the satellite to the receiver. This reception of both line-of-sight and reflected signals often results in the computation of inaccurate pseudo-range, and thus also introduces errors in the estimated position of the receiver. Due to the superposition of the direct and reflected signals (which are slightly delayed), the resulting correlation pattern deviates from its usual triangular shape exhibiting a multi-peak correlation curve. The earliest correlation peak corresponds to the direct signal, but the position of the peak may be shifted from its true position due to the superposition of the direct and reflected signals. This shift in the position of the correlation peak results in pseudo-range error and error in the computed receiver position. Further, the early and late correlators adjust their values to be equal and force the prompt correlator to remain at the center. Thus the prompt correlator represents the wrong peak. This will be discussed later in this section. This reception scenario may be more complex in the presence of a plurality of reflected signals.

There are several known methods available to estimate and compensate for the error due to multi-path. One of the most popular and widely used method is the use of narrow correlators as explained in the paper titled "NovAtel's GPS receiver—The high performance OEM Sensor of the Future" by P. Fenton et al presented at ION GPS-91, September 1991. Additional details on narrow correlator spacing may be found in the paper, "Theory and Performance of Narrow Correlator Spacing in a GPS Receiver" by A. J. Van Dierendonck et. al., Journal of The Institute of Navigation, vol. 39 no. 3, Fall 1992. Another paper "A practical Approach to the reduction of Pseudorange Multipath errors in L1 GPS receiver" by B. R. Townsend et. al. presented in ION GPS-94, Sep. 20-23, 1994 illustrates a method of multipath mitigation but this method requires a lot of computational power. Further a Delay Lock Loop approach also known as MEDLL has been describe in, "The Multipath Estimating Delay Lock Loop Approaching Accuracy Limits" presented at the IEEE Position, Location, and Navigation Symposium on April 1994 by R. Van Nee et. al. and also requires more computational power. A multipath mitigation approach using modernized GPS Signals has been discussed by L. Weill in his paper titled, "Multipath Mitigation Using Modernized GPS Signals: How good Can it Get?" presented at ION GPS 2002, September 2002 with pp. 24-27. This approach can be implemented only upon the modernized signals that are available in the GPS system. The correlators in a spread spectrum or GPS receiver give the correlation values for different phase shifts between the received and local PN sequence. Usually the separation is about half of a chip, where a chip is one bit of the PN sequence. In GPS navigation, a half-chip delay corresponds to about 150 meters of distance. Therefore, if the reflected signal has a pseudo-range which is 150 meters more than the direct signal, it contributes to the energy of the next correlator also known as the Late (L) correlator, rather than to the correct correlator known as the Prompt (P) correlator. Thus, the resulting correlation curve may shift the peak towards the L correlator. When the pseudo-range change is different from 150 meters, the correlation curve may take a different shape. When the correlators are placed closer than a half chip apart, a reflected signal may peak in one of these correlators, so that the direct and reflected signals may be separated. The use of narrow correlators, however, increases the hardware complexity and power consumption. Use of a multi-antenna system to nullify the gain in the direction of multi-path is another technique employed which is useful mostly in static conditions. The ground-plane and helical shield are useful only under static conditions. Other methods of multi-path mitigation include one based on the level of stability of the pseudo-range as given in U.S. Pat. No. 6,484,098, one based on the use of L1 and L2 signals as given in U.S. Pat. No. 5,185,610, one based on the use of multi-bit correlators as given in U.S. Pat. No. 6,393,046, one based on data bits as given in U.S. Pat. No. 5,963,601, a velocity based method as given in U.S. Pat. No. 5,771,456, a satellite trajectory based method as given in U.S.

Pat. No. 5,726,659, may be based on the variation in SNR, using wavelets or Maximum Likelihood (ML) or Minimum Mean-Square-Error (MMSE) methods. However, most of these methods may not provide good multi-path mitigation below a certain value of multi-path length or in some other cases may involve a lot of computation. Some of these techniques are useful only when one multi-path component is present while in practice there may be many possible reflected components.

Recently, multi-path mitigation techniques based on correlator outputs such as the Early (E), Prompt (P), Late (L) have been developed. These are based on the fact that the earliest component at the receiver is the direct signal while various reflected signals arrive later and contribute to the later correlator outputs. Published U.S. patent application 2005/0032477A1 from Qualcomm Inc. uses stored correlation curves and compares them with the present correlation curve to determine the multi-path. This technique also includes mathematical models. However, this technique requires lot of storage memory and also the comparison may not hold good under all conditions. U.S. Pat. No. 5,692,008 assigned to NovAtel and U.S. Pat. No. 6,917,644 assigned to SiRF determine the shift in Prompt (P) correlator position due to the requirement E=L, the E and L being subjected to different levels of reflected signal power. The SiRF patent takes into account only the E, P and L correlators in determining multi-path while the NovAtel patent does not specifically give any number of correlators. Published U.S. patent application US2004/0208236 A1 from NovAtel discloses the use of correlation curve shape or Pulse Aperture Correlator (PAC) in determining the multi-path. However, this approach requires a lot of computation and associated hardware. Another method for mitigation of the multi-path effect is the double delta technique. This technique uses five correlators but has the disadvantage that it requires a high precision measurement of E2, E1, L1 and L2 values because the measured differences (E1−L1) and (E2−L2) are usually very small.

Most of the above multipath methods require a set of narrowly spaced correlators. However, providing a large number of correlators results in increased gate count in the hardware, which increases the power and the physical size. Further, it is not possible using these methods to adaptively change the correlator spacing as may be required in varying multipath conditions.

Accordingly, there is a need in the art for a navigational satellite signal receiver to be able to detect and compensate for the multipath effect without increasing the number of correlators or power consumed. There is also a need for a receiver that can adaptively change the correlator spacing for varying multipath conditions.

SUMMARY

The present invention provides systems and methods for implementing narrowly spaced correlators to mitigate multi-path error, and systems and methods for adaptively changing the correlator spacing for varying multipath conditions.

In an embodiment, two sets of correlators with the same code frequency but different code phases are used to implement an adjustable correlator spacing. The correlator spacing is determined by the code phase difference between the two sets of correlators, which can be adjusted by adjusting the code phase values of Numerically Controlled Oscillators (NCOs).

In one embodiment, one set of physical correlators is used sequentially to implement two sets of correlators with the same code frequency but different code phases. In this embodiment, the physical set of correlators operate twice on the same set of signal samples to implement both sets of correlators, which requires that the physical correlators run at a relatively high clock speed.

In another embodiment, where the clock speed is lower, the same set of physical correlators is used to alternately implement the two sets of correlators on a time division basis.

The present invention may be implemented in special hardware or in software with no changes to existing hardware.

An advantage of embodiments of the present invention is that they can achieve much narrower correlators spacing than conventional techniques, e.g., by making the code phase difference between the two sets of correlators very small. Further, the correlator spacing can be adjusted for varying multipath conditions, whereas the correlator spacing in conventional techniques is fixed.

The above and other advantages of embodiments of this invention will be apparent from the following more detailed description when taken in conjunction with the accompanying drawings.

DETAILED DESCRIPTION

Figure 1:
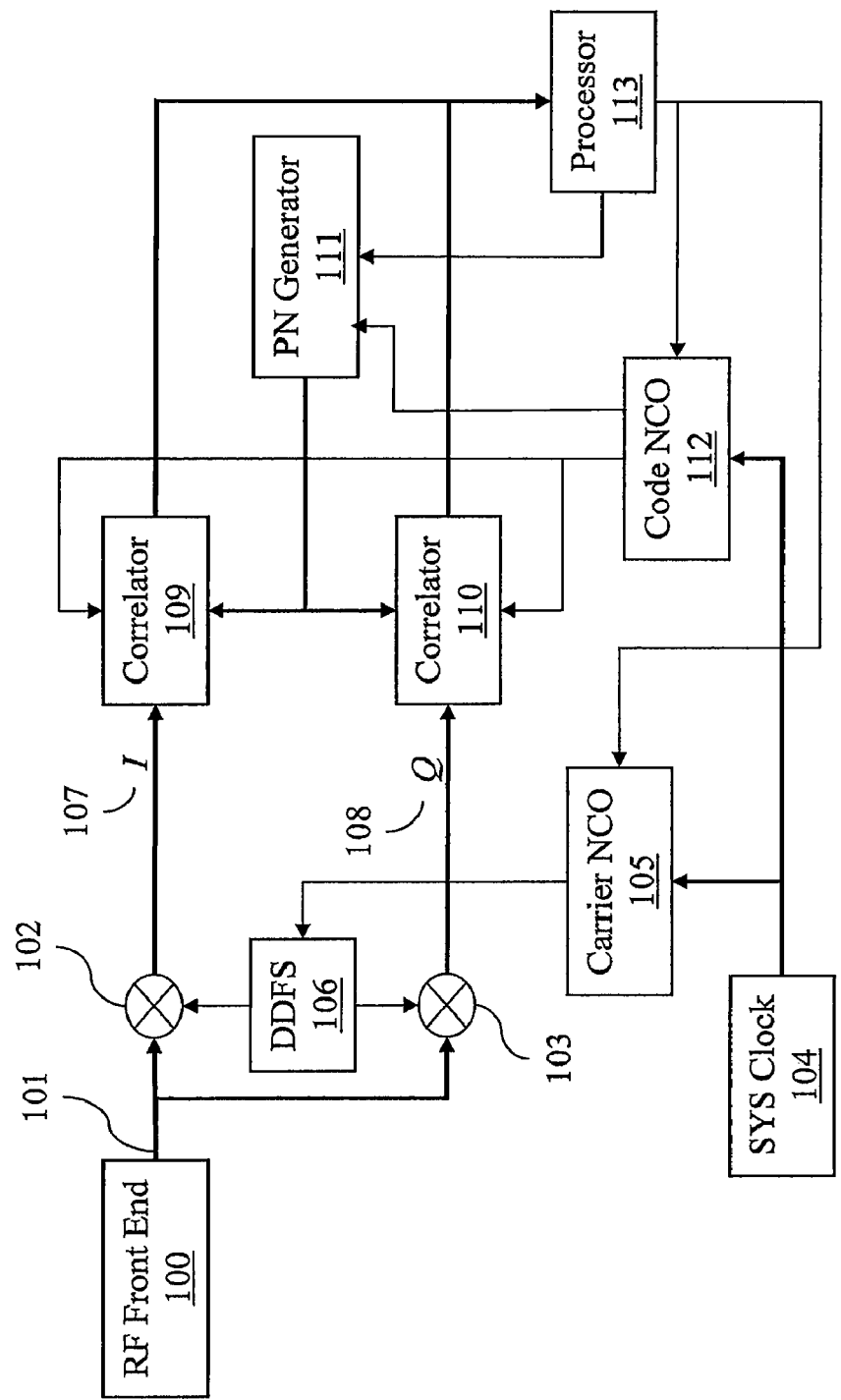
FIG. 1 is a block diagram illustrating a GPS receiver according to an embodiment of the present invention.

FIG. 1 illustrates a receiver according to an embodiment of the invention. An intermediate frequency (IF) signal input 101 enters a baseband section of the receiver from an analog-to-digital converter (ADC) output of a conventional RF front-end 100. The IF input is multiplied in IF mixers 102 and 103 in-phase and in quadrature, respectively, with a local frequency signal generated by a direct digital frequency synthesizer (DDFS) 106. This mixing involves multiplying the ADC output 101 by the local DDFS frequency in-phase which generates the in-phase component I 107. In a parallel path the same signal 101 is multiplied by the DDFS frequency in quadrature (i.e., with a phase shift of 90 degrees) to produce quadrature component Q 108. The DDFS 106 is driven by a carrier numerically controlled oscillator (NCO) 105. In addition, carrier NCO 105 receives phase and frequency corrections from a processor 113. Because of this correction, the DDFS frequency and phase is almost the same as that of the ADC output 101. Thus the I and Q signals produced by the IF mixers 102 and 103 are at near zero carrier frequency after being low-pass filtered to remove the high frequency components which are at twice the IF frequency band.

The I and Q components 107 and 108 are correlated in correlators 109 and 110, respectively, with a locally-generated PRN sequence generated by a PRN generator 111. The PRN-sequence corresponds to the satellite whose signal is being processed by the baseband section at that time. The PRN sequence generator is driven by code NCO 112. The local code frequency is made equal to the code rate of I and Q paths by corrective feedback from processor 113 to the code NCO 112. In addition, processor 113 sends a signal to PRN code generator 111 to set the starting phase of the locally generated code. The NCO 112 provides the correct clock signals to correlators 109 and 110. For example, NCO 112 provides a clock signal to generate two samples per PRN chip in the signal acquisition stage and three samples per chip during the tracking stage. SYS CLK 104 provides to NCO 105 and NCO 112 a common clock synchronization signal. The correlator outputs are then sent to processor 113 at every millisecond interval. The processor 113 is preferably a digital signal processor (DSP) core suitable for high speed arithmetic computations. Subsequent processing of the signals take place in the processor 113, as will be described in detail below. Additional details of the receiver baseband section described above are contained in U.S. patent application Ser. No. 11/123,861 filed on May 6, 2005, the specification of which is incorporated herein by reference.

The DSP core 113 receives one millisecond integrated (correlated) I and Q values from the GPS baseband section described above. In order to acquire a GPS signal in the DSP processor, all dwells (set of carrier frequency, code offset) are searched. This is a two-dimensional search. Coherent integration and non-coherent integration are two commonly used integration methods to acquire GPS signals. Coherent integration provides better signal gain at the cost of larger computational load, for equal integration times.

A First-In-First-Out memory (not shown) may be used to store IF signal samples obtained at the A/D converter of the RF front-end for later processing by the baseband section including the correlators. The stored samples are read and processed on a first-in-first out basis. The signal samples may also be stored in other types of memory for later processing by the correlators.

Figure 2A:
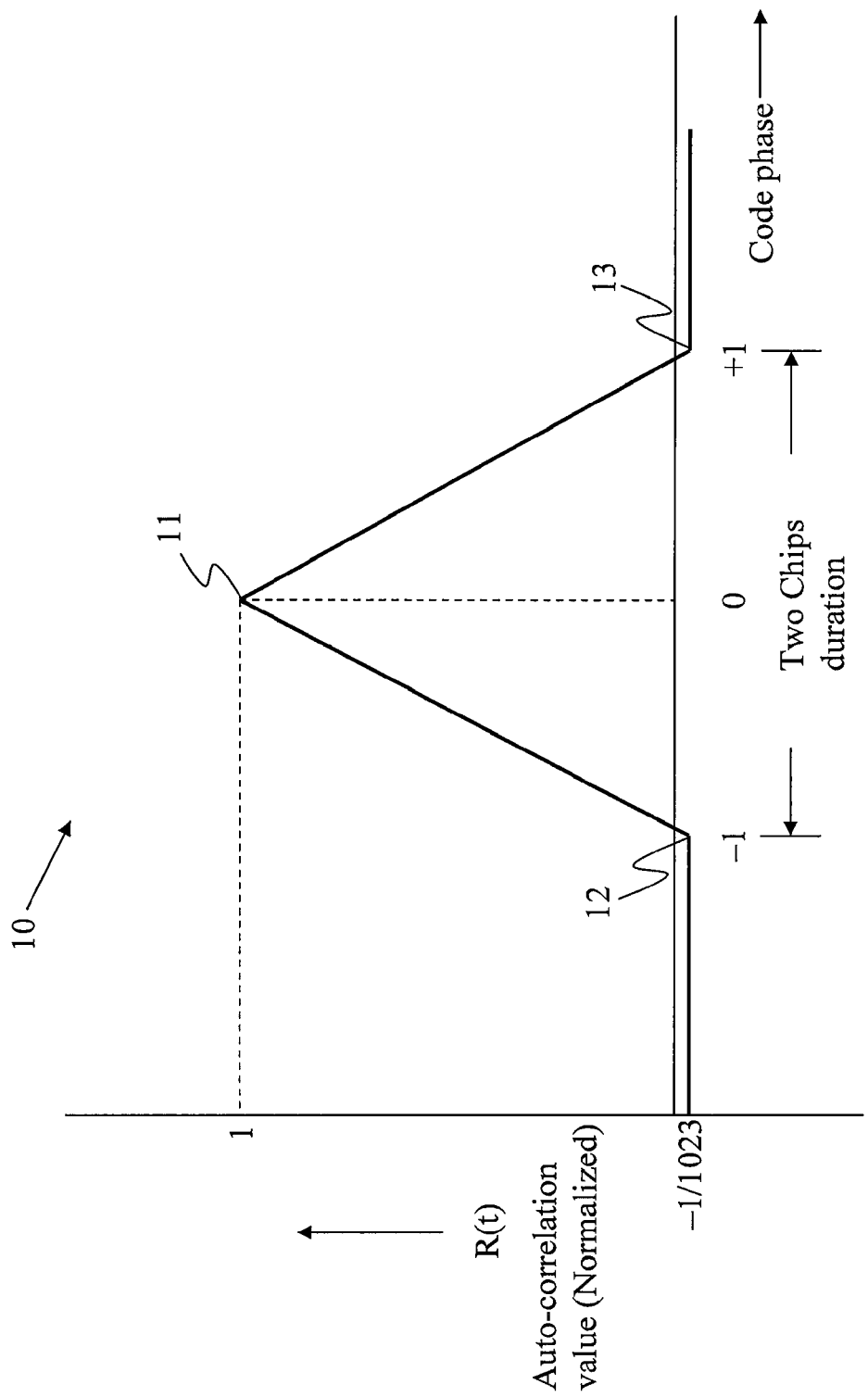
FIG. 2A illustrates an ideal correlation curve for spread spectrum communication.

A spread spectrum or navigation receiver employing spread spectrum techniques compares or correlates the received signal samples with a locally generated replica, both of which are spread by the same PN sequence. The phase of the local replica is changed until a high correlation value indicative of the synchronization has been reached. The correlation value curve usually has a triangular shape as shown by reference 10 in FIG. 2A. The maximum value of 1023 (for Gold code of length 1023) for zero phase offset is shown by reference 11 and the curve linearly decreases to −1 when the phase offset is one chip on either side of the maximum value as indicated by references 12 and 13. Alternatively, the maximum correlation point can be represented by a normalized value of 1 and the lower value represented by $-1/1023$.

Figure 2B:
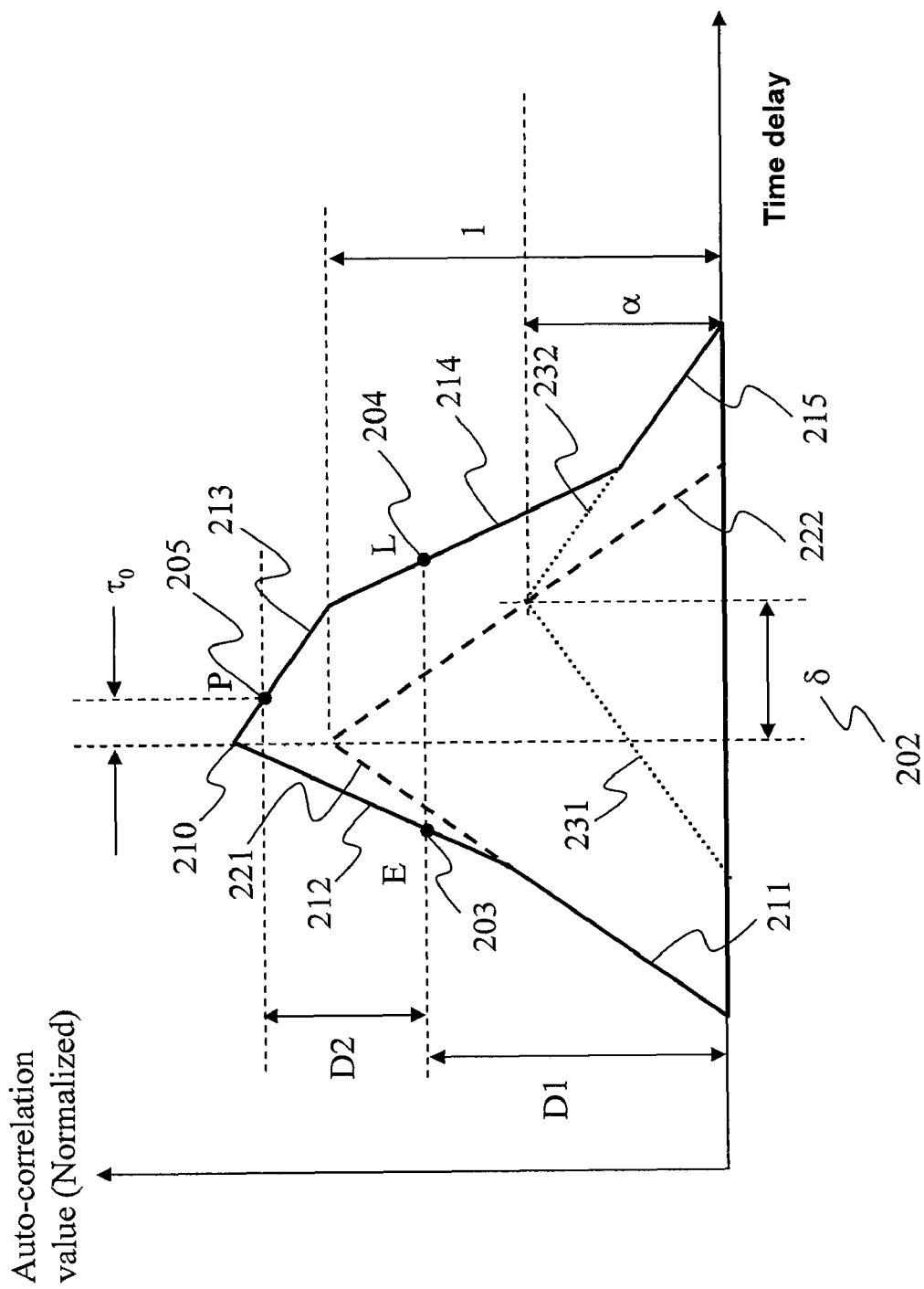
FIG. 2B illustrates an example of a correlation curve with both a direct signal and a single reflected or multi-path signal.

FIG. 2B represents the variation of the correlation value when a reflected signal or multi-path is present. The correlation due to the superposition of the direct and reflected signal is shown by the curve 210. The non-linear curve 210 consists of various linear components 211, 212, 213, 214 and 215 due to the superposition of the direct and multi-path signals. The correlation triangle due to the direct signal is represented by the sides 221 and 222. The correlation triangle due to the reflected signal is represented by the sides 231 and 232. The superposition of these two triangles results in the correlation curve 210. In the curve 210, portion 211 is due to the direct signal, portion 212 is due to the superposition of the leading edges 221 and 231 of the direct and reflected signals, respectively. The linear portion 213 is the result of the superposition of the trailing edge 222 of the direct signal and the leading edge 231 of the reflected signal. The linear portion 214 is the result of the superposition of the trailing edge 222 of the direct signal and the trailing edge 232 of the reflected signal and finally the linear portion 215 is due to the trailing edge 232 of the reflected signal. The delay between the direct signal and the reflected signal is given by 202 or $\delta$ shown as the distance between their correlation peaks. The correlation peak value is 1 for the direct signal while the peak value for the reflected signal is $\alpha$. A basic spread spectrum or GPS receiver usually has three correlators: the Early (E), Prompt (P) and Late (L) correlator. While a signal is being tracked, the power level of the E correlator represented by 203 and the power level of the L correlator represented by 204 will be forced by the Delay Lock Loop (DLL) of the receiver to have equal power such that power of E=power of L. This will force the Prompt (P) correlator to be at the center of E and L at P indicated by 205. The corresponding correlation power will be equal to (D1+D2) where D1 is the correlation power of E or L. Thus as shown in FIG. 2B, the Prompt (P) correlator has been shifted by $\tau_0$ with respect to the peak of the direct signal. Thus $\tau_0$ represents the error in time computation due to the multi-path. This error has to be determined to correct for multi-path error in the pseudo-range.

Figure 2C:
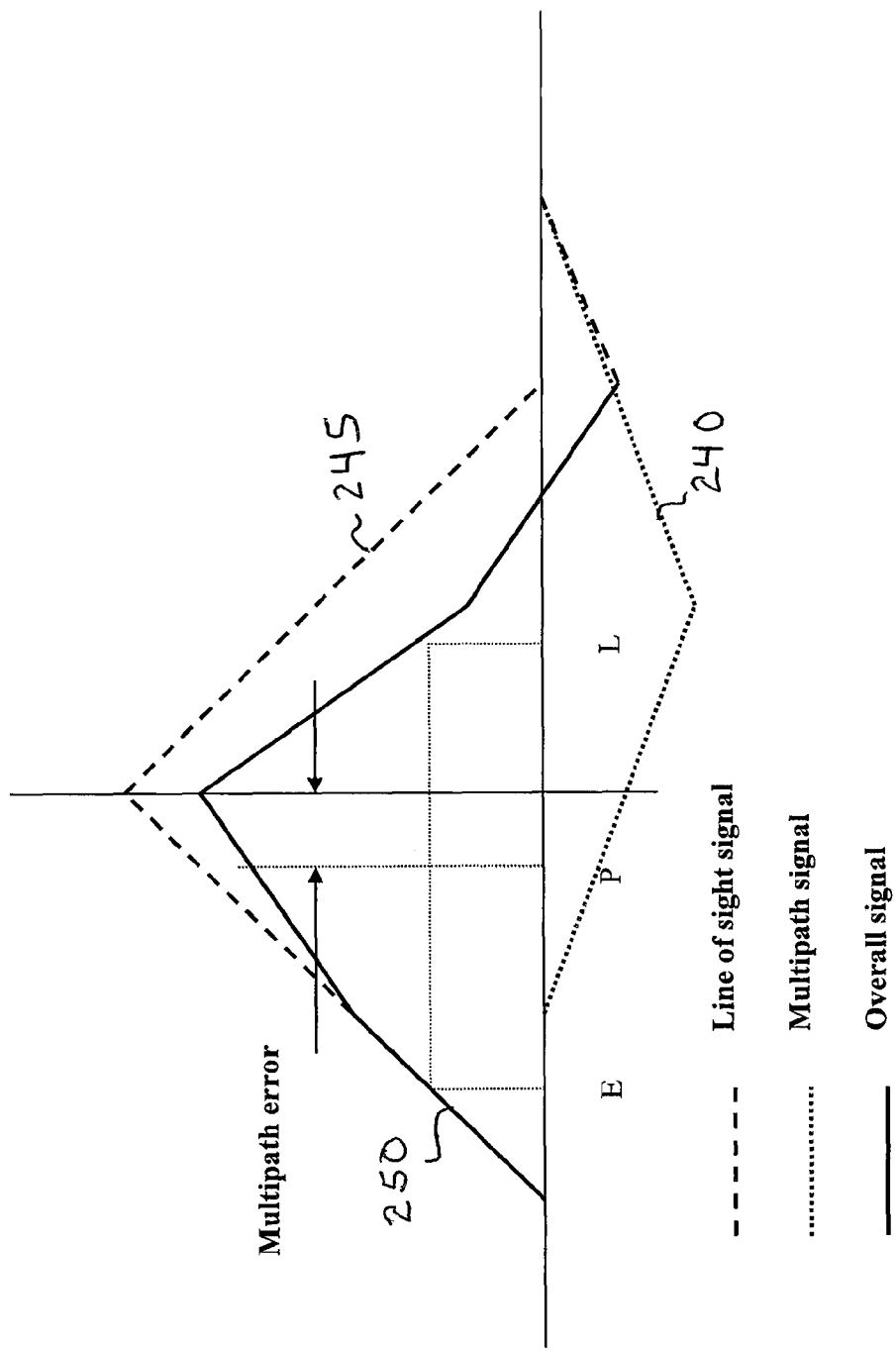
FIG. 2C illustrates an example of a correlation curve with both a direct signal and a single reflected or multi-path signal having a phase shift of 180 degrees.

Under some conditions, the reflected multipath signal 240 may be phase reversed with respect to the direct signal 245 shown in FIG. 2C. The resulting correlation profile or curve 250 has a decreased value in the overlapping region.

Figure 3:
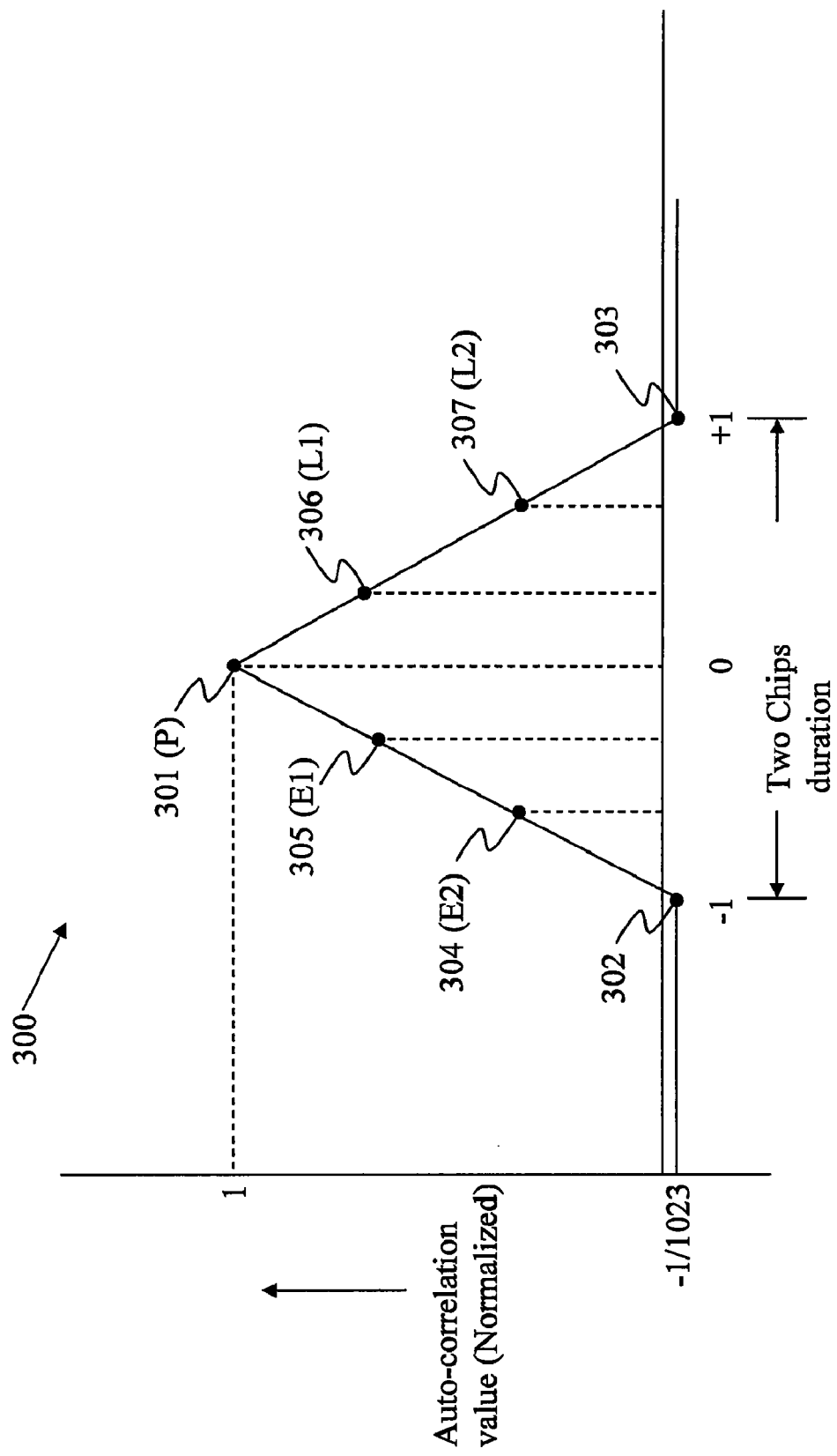
FIG. 3 illustrates an example of a correlation curve with a correlator spacing of ⅓ of a chip.

When correlators are spaced more closely, there will be more than one Early and Late points on the early-side and late-side edge of the correlation curve. In one of the embodiments considered here and shown in FIG. 3, there are two early correlators denoted by 305 (E1) and 304 (E2) and two late correlators denoted by 306 (L1) and 307 (L2). The positioning of these correlators and corresponding auto-correlation values are also shown in FIG. 3 for a direct signal with no multi-path. In general, the five different code phases that generate the E1, E2, P, L1, L2 correlation values are separated by an interval of at least one-third of a chip of the local PN sequence. In the case shown in FIG. 3, the correlation value at 305 and 306 is ⅔ of the value at 301 while it is ⅓ at 304 and 307. As already shown above, the triangular form will be distorted when multi-path is present.

Figure 4:
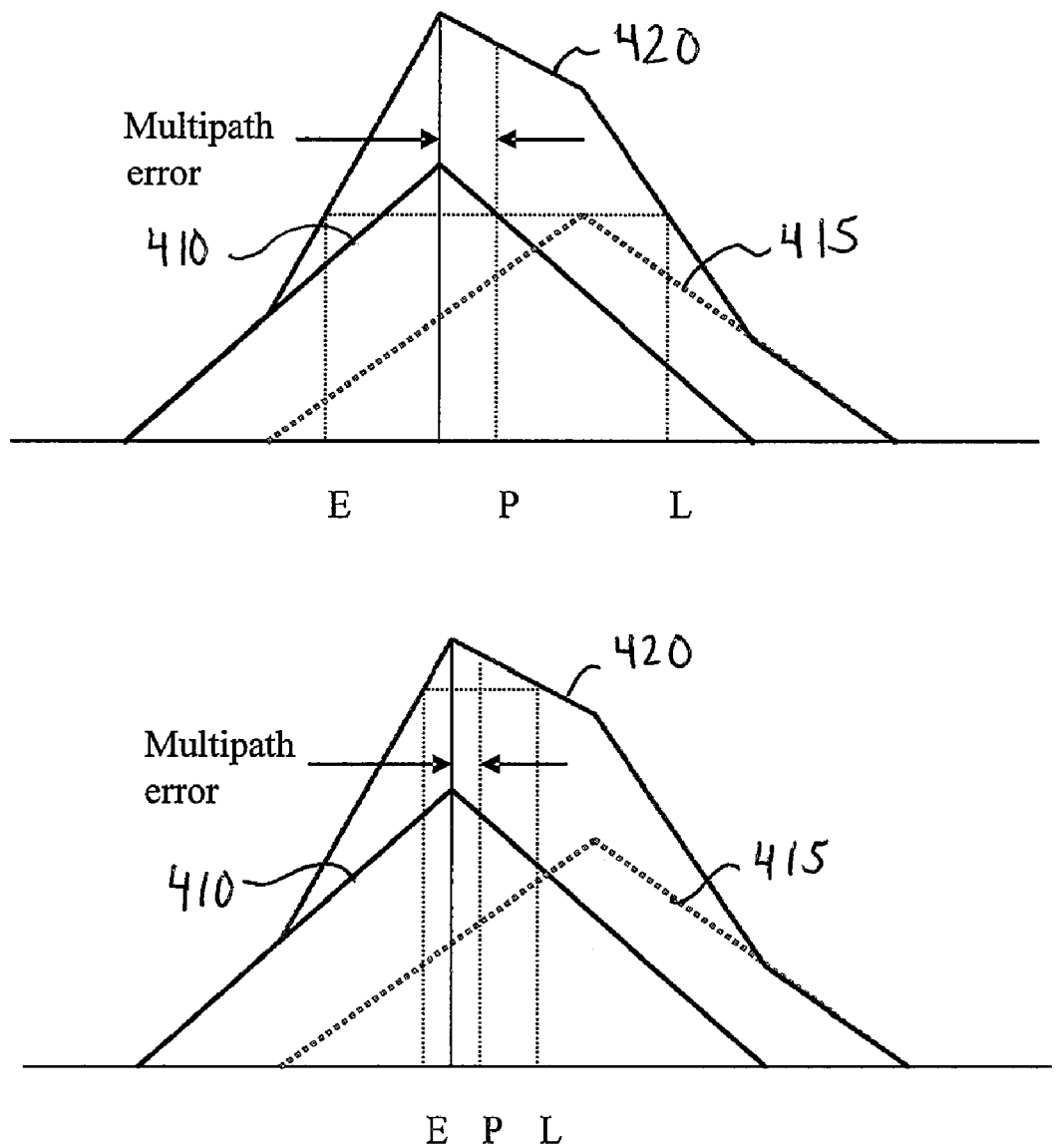
FIG. 4 illustrates a reduction in multipath error by a reduction in the correlator spacing.

From the above, it may be seen that the multipath error will be reduced when the correlator spacing is reduced. FIG. 4 shows a comparison of the multipath error for a large correlator spacing and a small correlation spacing for the same direct signal 410, reflected signal 415, and overall signal 420. As shown in FIG. 4, a reduction in the correlator spacing reduces the multipath error. Thus the multipath error can be reduced by having a narrowly spaced correlator design. However, in a fixed correlator design the spacing can not be reduced arbitrarily. Further, a larger number of correlators results in more hardware and associated power consumption and size.

Figure 5:
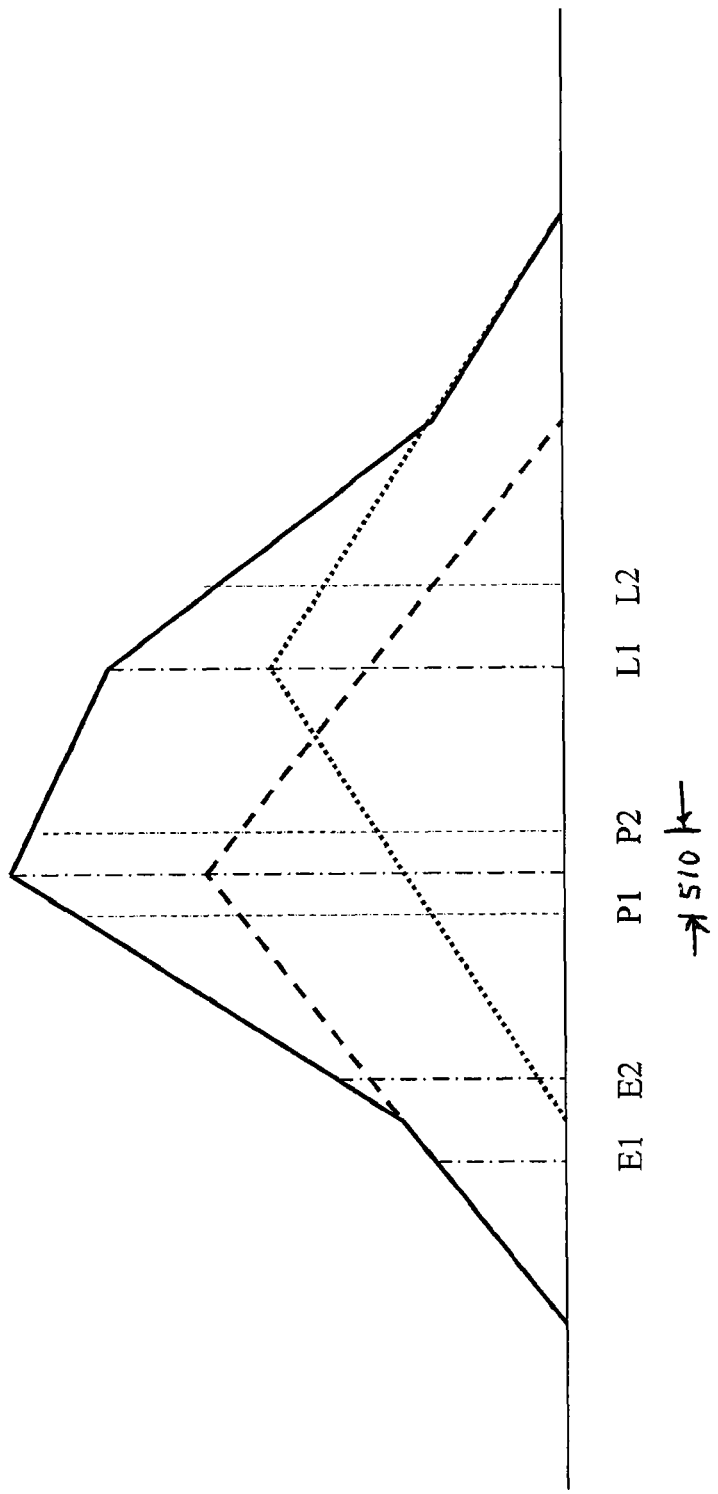
FIG. 5 illustrates two sets of correlators for implementing a narrow correlator with adjustable correlator spacing according to an embodiment of the present invention.

To overcome the above problems, an embodiment of the invention uses two sets of correlators to track the correlation peak. These two sets of correlators may be provided by two channels of the receiver. The two sets of correlators use the same code frequency, but have different code phase offsets resulting in a correlator spacing between the two sets of correlators. This correlator spacing between the two sets of correlators may be controlled by inputting different initial code phase values into their code NCOs (Numerically Controlled Oscillators). The code NCOs enable the code frequency and code phase of the correlators to be digitally controlled by inputting appropriate numerically values into the NCOs. In one embodiment, each set of correlators has an Early, Prompt and Late correlator. This embodiment is shown in FIG. 5, in which E1, P1, and L1 correspond to one set of correlators and E2, P2, and L2 correspond to the other set of correlators. The correlator spacing 510 between the two sets of correlators can be adjusted by adjusting the difference between the initial code phase values in their NCOs. By choosing different code NCO phase differences or bias values, the correlator spacing can be reduced to any desired value. In this embodiment, the P1 and P2 correlators can be used to track the peak of the correlation in the received signal in the presence of multipath.

For example, the P1 and P2 correlators may be used to replace the E and L correlators used in conventional receivers, in which the power of the P1 and P2 correlators are forced to be equal by the DLL with the correlation peak taken as the center between the P1 and P2 correlators. The advantage of using the P1 and P2 correlators in place of convention E and L correlators is that the spacing between the P1 and P2 correlators can be made much narrower by making the difference in the code phase values of their NCOs small. Further, the spacing between the P1 and P2 can be adjusted for varying multipath conditions, whereas the spacing between conventional E and L correlators is fixed. This example gives just one possible non-limiting use of the adjustable correlator spacing of the present invention.

Figure 6:
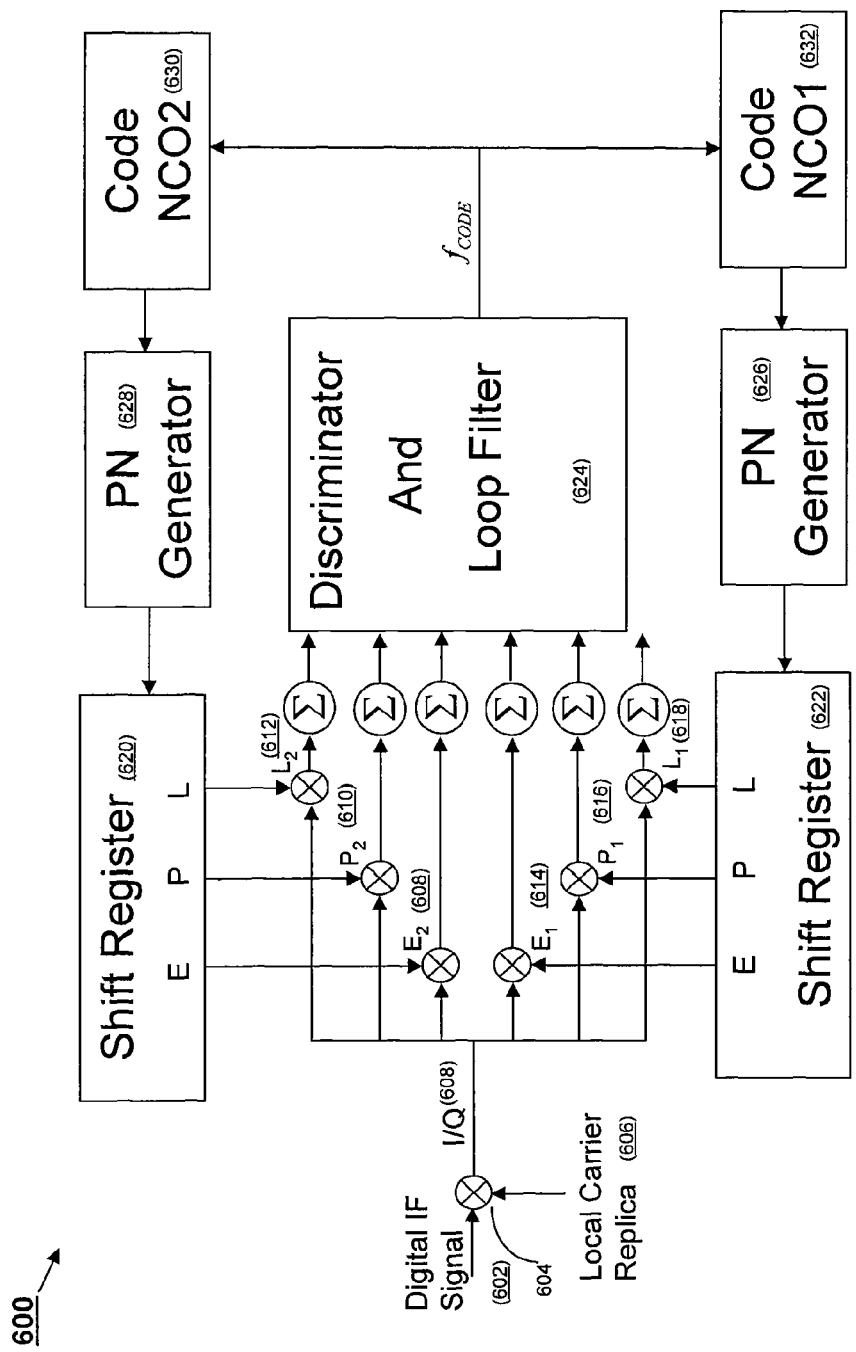
FIG. 6 illustrates a hardware implementation of a narrow correlator with adjustable correlator spacing according to an embodiment of the present invention.

FIG. 6 illustrates an exemplary hardware implementation 600 according to an embodiment of the invention. In FIG. 6 the IF signal digital samples 602 are mixed or multiplied and low pass filtered by mixer 604 with the local carrier replica 606 to remove the IF carrier from the input. This is done with both the I and Q components of the IF signal. The output of the mixer 604 contains I and Q components 608 with a small residual frequency modulation. The resulting I and Q 608 are fed to two sets of E, P and L correlators, i.e., E1, P1, L1 denoted as 614, 616, 618 and E2, P2, L2 denoted by 608, 610, 612. Two shift registers 620 and 622 provide the local E, P and L signals. These shift registers are driven by PN code generators 628 and 626 which are again driven by the numerically controlled oscillators NCO1 630 and NCO2 632, respectively. The output of the mixers 608 to 616 are integrated or summed separately and input to the discriminator and loop filter 624 to obtain the code frequency $f_{CODE}$. This $f_{CODE}$ frequency drives the NCO1 630 and NCO2 632. The phase difference between NCO1 630 and NCO2 632 is adjusted to obtain the required narrow correlator spacing.

The above embodiment describes an implementation in a dedicated hardware. Methods of the invention can also be implement in software without any additional hardware. Thus in software implementations, methods of the invention can be practiced using the baseband hardware shown in FIG. 1 with no additional hardware. Further, this software approach can be implemented in two different embodiments.

The first embodiment is based on a direct implementation. In this method one hardware correlator set can be used to implement both correlator sets. This may be done by having one hardware correlator set operate twice on the same set of stored signal samples at the same code frequency but different code phases to implement both correlator sets. This requires the correlator set to run fast enough to accommodate both sets in one hardware set. The signal samples may be read from the FIFO memory mentioned earlier. While the P1 and P2 provide narrow correlation space, the E1, E2 and L1, L2 provide correlation values for wider correlation space. This is useful to guard against large code delay error, which occurs when the peak is far away from the P1 and P2. In this case, the values of E1, E2 and L1, L2 can be used to find the peak.

The second embodiment of implementation is based on time-sharing of the correlators. In this method, if the correlators can not run fast enough, a time division approach can be used. In one embodiment, one hardware correlator set is used by having the correlator set alternately implement the E1, P1 and L1 set and the E2, P2 and L2 set. For example, the correlator set may implement the E1, P1 and L1 set during odd milliseconds and the E2, P2 and L2 set used during even milliseconds. In this embodiment, the NCO code phase value is suitably updated, e.g., by adding or subtracting a code phase value corresponding to the desired correlator spacing between implementations. Overflow and underflow problems may also need to be taken care of in both methods, which occurs when the result of a code phase adjustment is larger or smaller than the range that the code NCO can represent.

In an embodiment, a computation of error due to the multipath may be done by determining the profile of the correlation and using a suitable algorithm to determine the corresponding error in pseudorange. The correlation profile may be determined by computing the correlation values at different code phases or different code phase differences between the correlator sets. In this embodiment, the correlation profile is evaluated for symmetry with respect to the center or maximum value. In the case of a symmetric correlation profile, it can be concluded that no multipath signal is present. This symmetry is similar to the one shown in FIG. 2A for the ideal case. For a non-symmetric profile, the multipath error may be approximated as the difference in position between the maximum correlation value and the tracked correlation peak.

For the case in which a multipath signal is present, the shape of the auto-correlation function becomes unsymmetrical. With a large Early-Late spacing correlator design, the peak will not be at the correct position, in which case a multipath error occurs. The P1 and P2 correlators shown in FIG. 5 may be used to provide a pair of Early-Late correlators with much narrower spacing to help mitigate the effects of multipath error. Further, the correlator spacing can be flexibly changed to adopt different multipath mitigation algorithms. The spacing may also be changed for varying multipath corrections. For example, the correlator spacing may be narrowed to reduced a detected multipath error.

Although the present invention has been described in terms of the presently preferred embodiments, it is to be understood that the disclosure is not to be interpreted as limiting. Various alterations and modifications will no doubt become apparent to those skilled in the art after having read this disclosure. For example, although the above embodiments have been described using the GPS system as an example, the techniques and methods may be used for other global satellite navigational systems including GLONASS, Galileo, secondary systems such as WASS, EGNOS, and MSAS, as well as hybrids of the above systems. Further, the said invention can be practiced with any Direct Sequence Spread Spectrum receivers. Accordingly, it is intended that the appended claims be interpreted as covering all alterations and modifications as fall within the spirit and scope of the invention.

What is claimed is:

1. A method of multipath mitigation in a spread spectrum receiver, comprising:
   correlating a received signal in two sets of baseband correlators with an adjustable code phase difference between the two sets of correlators;
   obtaining a number of correlation values around a correlation peak by adjusting the code phase difference;

determining a correlation profile based on the correlation values; and determining an error due to multipath based on the correlation profile.

2. The method of claim 1, wherein a correlator spacing between the two sets of correlators is a function of a code phase difference in a Numerically Controlled Oscillator (NCO).

3. The method of claim 1 implemented in hardware.

4. The method of claim 1 implemented in software.

5. The method of claim 4, wherein the same set of physical correlators is used to implement the two sets of correlators with different code phases and the same set of signal samples.

6. The method of claim 4, wherein the same set of physical correlators is used to alternately implement the two sets of correlators with different code phases and alternative sets of signal samples.

7. The method of claim 1 implement in both hardware and software.

8. The method of claim 1, wherein samples of the signal are stored in a first-in-first-out memory buffer which can be processed a plurality of times.

9. The method of claim 1, wherein correlation values generated by the two sets of correlators are used by a Delay Lock Loop in a signal locking process.

10. The method of claim 1, wherein each set of the baseband correlators further comprises:

a code Numerically Controlled Oscillator (NCO), wherein the code NCO generates a pseudorandom number (PRN) sequence, samples the PRN sequence and has an adjustable initial code offset and initial frequency offset;

a carrier NCO generating a local frequency which is multiplied with the received signal; and a memory which stores correlation values, the correlation values being generated for a given correlator spacing based on the NCO initial code offset.

11. The method of claim 1, wherein the correlating step includes:

receiving the same code at the two sets of baseband correlators, the two sets of baseband correlators both comprising at least two mixers;

shifting a phase of the same code by the same first and second fractions of a chip for the two mixers in both sets of baseband correlators, respectively;

additionally shifting the phase of the same code by the code phase difference for the two mixers in only one of the two sets of baseband correlators;

providing the same code shifted only by the first and second fractions of the chip to the two mixers in one of the sets of baseband correlators; and providing the same code shifted by the first and second fractions of the chip and the additional code phase difference to the two mixers in the other of the sets of baseband correlators.

12. A method of multipath mitigation in a spread spectrum receiver, comprising:

correlating a received signal in two sets of baseband correlators with an adjustable code phase difference between the two sets of correlators;

obtaining a number of correlation values from the two sets of correlators; and tracking a code phase of the received signal based on the correlation values from the two sets of correlators.

13. The method of claim 12, wherein a correlator spacing the two sets of correlators is a function of a code phase difference in a Numerically Controlled Oscillator (NCO).

14. The method of claim 12, wherein each set of correlators comprises an Early correlator, a Prompt correlator, and a Late correlator.

15. The method of claim 12, further comprising:

forcing the power of two correlators, one from each of the two sets of correlators, to be substantially equal; and tracking the code phase of the received signal based a position between the two correlators.

16. The method of claim 12, wherein the same set of physical correlators is used to implement the two sets of correlators with different code phases and the same set of signal samples.

17. The method of claim 12, wherein the same set of physical correlators is used to alternately implement the two sets of correlators with different code phases and alternative sets of signal samples.

18. The method of claim 12, wherein each set of the baseband correlators further comprises:

a code Numerically Controlled Oscillator (NCO), wherein the code NCO generates a pseudorandom number (PRN) sequence, samples the PRN sequence and has an adjustable initial code offset and initial frequency offset;

a carrier NCO generating a local frequency which is multiplied with the received signal; and a memory which stores correlation values, the correlation values being generated for a given correlator spacing based on the NCO initial code offset.

19. The method of claim 12, wherein the correlating step includes:

receiving the same code at the two sets of baseband correlators, the two sets of baseband correlators both comprising at least two mixers;

shifting a phase of the same code by the same first and second fractions of a chip for the two mixers in both sets of baseband correlators, respectively;

additionally shifting the phase of the same code by the code phase difference for the two mixers in only one of the two sets of baseband correlators;

providing the same code shifted only by the first and second fractions of the chip to the respective two mixers in one of the sets of baseband correlators; and providing the same code shifted by the first and second fractions of the chip and the additional code phase difference to the respective two mixers in the other of the sets of baseband correlators.

\* \* \* \* \*